United States Patent
Cheng et al.

(10) Patent No.: US 7,461,280 B2
(45) Date of Patent: Dec. 2, 2008

(54) RECALL CIRCUIT FOR QUITTING A POWER SAVING MODE

(75) Inventors: Yu-Huei Cheng, Taipei (TW); Tzu-Huei Lee, Taipei (TW)

(73) Assignee: Tatung Co., Ltd. (TW)

( * ) Notice: Subject to any disclaimer, the term of this patent is extended or adjusted under 35 U.S.C. 154(b) by 476 days.

(21) Appl. No.: 11/269,855

(22) Filed: Nov. 9, 2005

(65) Prior Publication Data

US 2006/0123255 A1 Jun. 8, 2006

(30) Foreign Application Priority Data

Dec. 8, 2004 (TW) ............................. 93138005 A

(51) Int. Cl.
*G06F 1/00* (2006.01)
(52) U.S. Cl. ...................... 713/323; 713/300; 713/320; 345/158
(58) Field of Classification Search ................ 713/300, 713/320, 323; 345/158
See application file for complete search history.

(56) References Cited

U.S. PATENT DOCUMENTS

| | | | | |
|---|---|---|---|---|
| 5,973,810 A * | 10/1999 | Song | ........................... | 398/112 |
| 6,809,716 B1 * | 10/2004 | Kim | ........................... | 345/98 |
| 2003/0014675 A1 * | 1/2003 | Lee | ........................... | 713/310 |

\* cited by examiner

*Primary Examiner*—Thomas Lee
*Assistant Examiner*—Jaweed A Abbaszadeh
(74) *Attorney, Agent, or Firm*—Lowe Hauptman Ham & Berner, LLP

(57) ABSTRACT

A recall circuit for quitting a power saving mode is disclosed, which is applicable to a television functioning as the display screen of a computer, which mainly uses a microprocessor to turn on the power of all chips in the television, monitors the communication via $I_2C$ pins, and detects which chips require operations without the use of a bi-channel analog mixer and segregator to shift the television from the power saving mode to a use mode.

4 Claims, 2 Drawing Sheets

RECALL CIRCUIT FOR QUITTING A POWER SAVING MODE

BACKGROUND OF THE INVENTION

1. Field of the Invention

The present invention relates to a recall circuit for quitting a power saving mode and, more particularly, to a recall circuit for quitting the power saving mode of a television or an LCD monitor.

2. Description of Related Art

As shown in FIG. 1, a prior power saving device disconnects $I_2C$ pins that communicate with other chips 30, via a bi-channel analog mixer and a segregator 50, to attain the power saving mode. To shift the power saving mode to a normal mode, a video signal collecting chip 40 is required for detecting and communicating. At the shift moment, the other chips 30 are turned off, so the voltage levels of the $I_2C$ pins are uncertain. When the system is shifted from the power saving mode to the normal mode, it is required to have the video signal collecting chip 40 and microprocessor 11 to restore the communication with the other chips 30. However, the voltage level of $I_2C$ pins of the microprocessor 11 at the moment would be reduced by the uncertain voltage level of $I_2C$ pins of the other chips 30 to a low level, causing unavailability of normal communication with other chips, further causing unavailability of the screen and resulting in trouble of use.

Another technique of the prior art uses the bi-channel analog mixer and segregator 50 to control the communication between the microprocessor 11 and the other chips 30 to make the voltage levels of microprocessor 11 and $I_2C$ pins of the video signal collecting chip 40 not to be influenced. However, this method still requires the use of the bi-channel analog mixer and segregator 50 to control the voltage level of $I_2C$ pins so it is unable to solve the said problem perfectly and will still cause trouble to the users.

Therefore, it is desirable to provide an improved recall circuit for quitting a power saving mode to mitigate and/or obviate the aforementioned problems.

SUMMARY OF THE INVENTION

The object of the present invention is to provide a recall circuit for quitting a power saving mode, applicable to a television alternatively functioning as a display screen for a computer, the recall circuit comprising: a power regulator; a signal-enabling detecting circuit receiving an enable signal from a remote device and outputting the enable signal; a synchronizing signal detecting circuit receiving a horizontal synchronizing signal and a vertical synchronizing signal from the computer; and a microprocessor electrically coupled to the power regulator, the signal-enabling detecting circuit and the synchronizing signal detecting circuit respectively, wherein, when the microprocessor receives at least one inputting signal from the signal-enabling detecting circuit or the synchronizing signal detecting circuit, the microprocessor controls voltages provided by the power regulator for a television to quit the power saving mode and return to the normal mode. The signal-enabling detecting circuit comprises an RF receiver, and the remote device is a remote controller used for transmitting the enable signal. The enable signal is inputted by the keystroke on the remote device. The horizontal synchronizing signal and the vertical synchronizing signal are provided by a computer.

Therefore, present invention allows the television to use the microprocessor to turn on the power, proceed communication via $I_2C$ pins, and detect which chips are required to function/operate as it shifts from the power saving mode to the normal mode.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
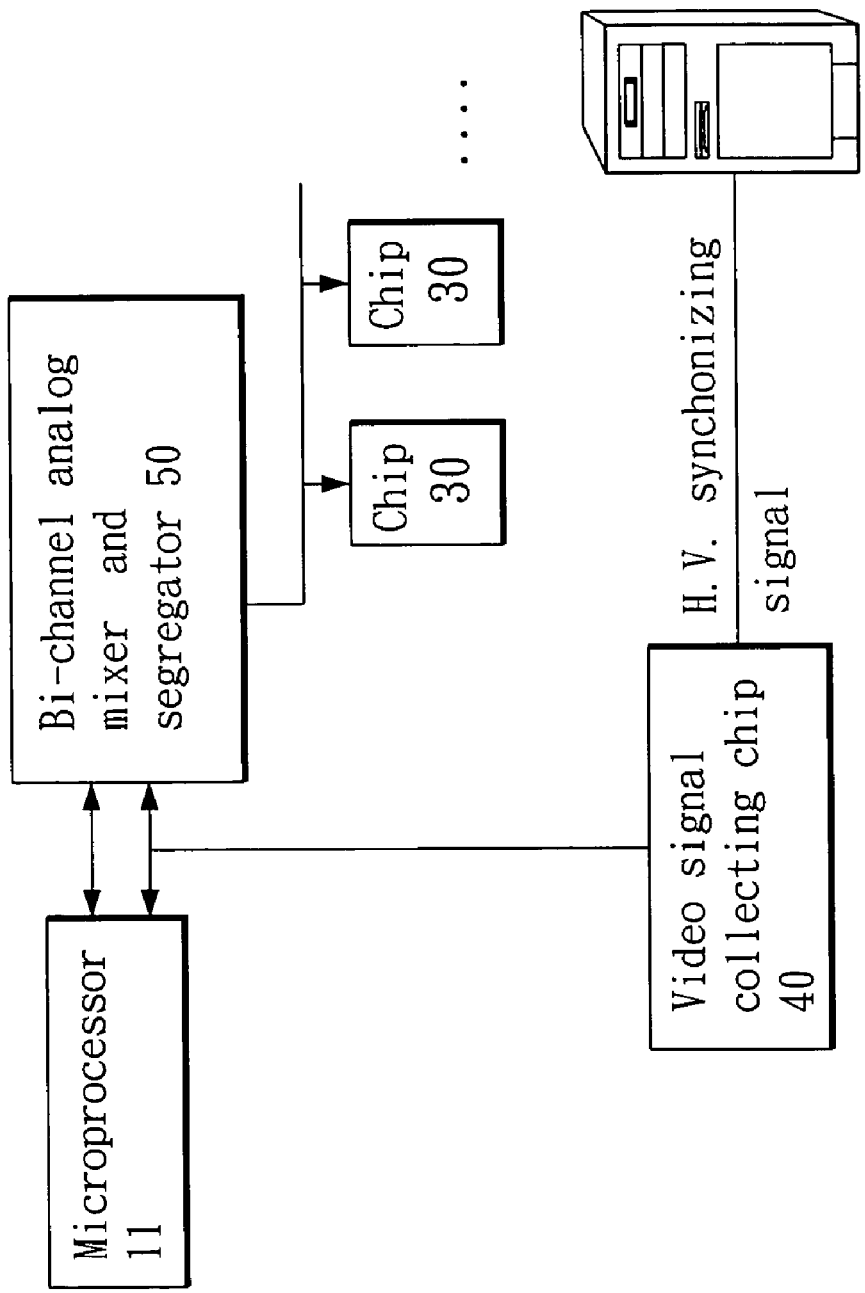
FIG. 1 is a functional block diagram of prior art recall circuit for quitting a power saving mode.
Figure 2:
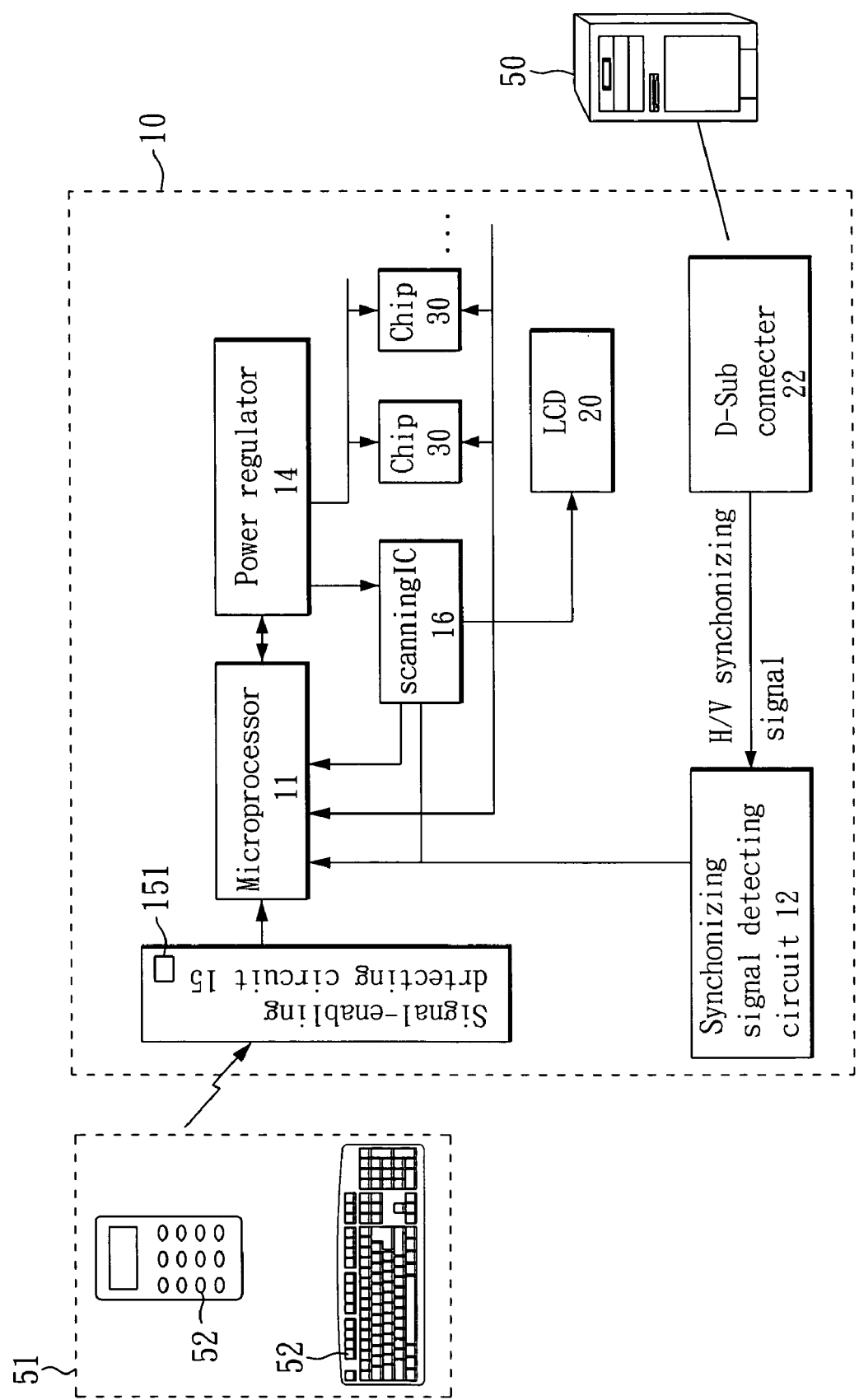
FIG. 2 is a functional block diagram of one preferred embodiment according to the invention.

With reference to FIG. 2, there is shown the functional block diagram of one preferred embodiment according to the invention. A recall circuit for quitting a power saving mode, applicable to a television for displaying a screen of a computer comprises a power regulator 14, a signal-enabling detecting circuit 15, a synchronizing signal detecting circuit 12 and a microprocessor 11. The signal-enabling detecting circuit 15 comprises an RF receiver 151, and the signal-enabling detecting circuit 15 receives an enable signal from a remote device 51. The enable signal is provided by the keystroke 52 on the remote device 51. The synchronizing signal detecting circuit 12 receives a horizontal synchronizing signal and a vertical synchronizing signal from a computer 50. The computer 50 is coupled to an LCD television 10 via a D-sub connector 22.

When the television is in the power saving mode the microprocessor 11 turns off a scanning IC 16 or multiple chips 30 installed in the LCD television 10. Multiple chips 30 installed in LCD television 10. In the embodiment, the microprocessor 11 communicates with other elements via $I_2C$ pins. Thus, when the LCD television is in the power saving mode, the condition of the microprocessor 11 and each $I_2C$ pin is OFF. When the LCD television 10 is shifting from the power saving mode to the normal mode, the microprocessor 11 detects if there are any enable signals from the computer 50. In the embodiment, the synchronizing signal detecting circuit 12 will detect whether or not the H/V synchronizing signal provided by computer 50. When the computer 50 sends any vertical or horizontal synchronizing signal to shift the LCD television 10 from the power saving mode to the normal mode, the synchronizing signal detecting circuit 12 transfers the vertical synchronizing signal and the horizontal synchronizing signal into dc level, and sends it to the microprocessor 11 to determine whether or not to enable the normal mode. In the preferred embodiment, when microprocessor 11 receives any enable signal from the computer 50, the keystroke 52 on the remote device 51, the remote device 51 controls the power regulator 14 to provide voltages to all elements installed in the LCD television 10. The microprocessor 11 further communicates with a scanning IC 16 and other chips 30 via the $I_2C$ pins and transfers the signal desired to be display to the LCD 10 via the scanning IC 16 after detecting the horizontal synchronizing signal and the vertical synchronizing signal.

As illustrated above, the present invention uses the microprocessor 11 to notify the power regulator 14 to open all elements installed in the LCD television 10, process communication to each element via the $I_2C$ pins, and select the desired element to operate to enable the normal mode. Therefore, the present invention does not require extra use of a bi-channel analog mixer and segregator to attain the purpose of shifting from the power saving mode to the normal mode.

Although the present invention has been explained in relation to its preferred embodiment, it is to be understood that many other possible modifications and variations can be made without departing from the spirit and scope of the invention as hereinafter claimed.

What is claimed is:

1. A recall circuit for quitting a power saving mode and returning to a normal mode, applicable to a television alternatively functioning as a display screen for a computer, comprising:

a power regulator;

a signal-enabling detecting circuit receiving an enable signal from a remote device and outputting the enable signal;

a synchronizing signal detecting circuit receiving a horizontal synchronizing signal and a vertical synchronizing signal from the computer; and a microprocessor electrically coupled to the power regulator, the signal-enabling detecting circuit and the synchronizing signal detecting circuit respectively;

wherein, when the microprocessor receives at least one inputting signal from the signal-enabling detecting circuit or the synchronizing signal detecting circuit, the microprocessor controls voltages provided by the power regulator for television to quit the power saving mode and return to the normal mode, and wherein the microprocessor is used to turn on the power, proceed communication via I2c pins, and detect which chips in the television are required to operate at its shift from the power saving mode to the normal mode.

2. The recall circuit for quitting the power saving mode as claimed in claim 1, wherein the signal-enabling detecting circuit comprises an RE receiver, and the remote device is a remote controller used for transmitting the enable signal.

3. The recall circuit for quitting the power saving mode as claimed in claim 1, wherein the enable signal is provided by a keystroke on the remote device.

4. The recall circuit for quitting the power saving mode as claimed in claim 1, wherein the television is an LCD television.

* * * * *